Patented Sept. 13, 1938

2,130,071

UNITED STATES PATENT OFFICE 2,130,071

LIGHT SENSITIVE PAPER AND METHOD OF TREATING SAME

Clyde A. Crowley and George H. Goodyear, Chicago, Ill., assignors to The Huey Company, Chicago, Ill., a corporation of Illinois No Drawing. Application April 29, 1938,
Serial No. 205,008

3 Claims. (Cl. 95—6)

Our invention relates to light-sensitive paper and particularly relates to a novel coating for blue print paper and to a chemical compound adapted for use in the preparation thereof.

This application is a continuation in part of our application, Serial No. 172,962, filed Nov. 5, 1937, which in turn is a continuation in part of our application, Serial No. 139,950, filed April 30, 1937, now issued as Patent No. 2,113,423.

A developer of the type intended for use in the described relation is disclosed in our U. S. Patent No. 2,093,421, granted September 21, 1937.

One of the principal problems in the manufacture of blue print paper is that of providing a coating therefor having a known stability or permanency under adverse climatic conditions; in other words, a paper that the manufacturer may distribute with the assurance that it will remain effective for at least a known period, preferably over one year. The desire, and in many cases, the necessity for a certain degree of permanency has been responsible for the general use of a coating compound that is relatively slow in action and which does not produce bright or intense blue color without bleeding and the resultant partial obliteration of the white lines. An object of our invention is, therefore, to provide a perfectly stable coating, one that operates to completely eliminate bleeding in development and one in which an intense blue is present in the final product, and a paper which prints at greater speed than products heretofore known.

The improvement is brought about by the use of a novel coating containing some of the usual components, but in which a substance that acts as a catalyzer to accomplish the needed results is incorporated. The catalytic agents which we have discovered are the cesium salts.

In practice, we prefer cesium mono-nitrate for those applications where the cost of this chemical in the sensitizer can be commercially tolerated. Cesium mono-nitrate appears to be the most desirable of the catalysts investigated, probably by virtue of the fact that under certain conditions which may prevail during the process of development with our special predeveloping solution described in our Patent No. 2,093,421, the valence of the cesium may be increased and the polyvalent ions resulting, act as secondary catalysts in connection with the special development process. Theoretically, the greater effectiveness of cesium mono-nitrate may be ascribed to two factors. Due to the heavier molecular weight of cesium, its absorption spectrum lies in a region of longer wave lengths. Most of the longer wave lengths of light falling on blue print paper during exposure are not effective because they are not absorbed. The presence of the cesium mono-nitrate, therefore, makes effective a greater proportion of the light which falls on the paper.

The second factor making cesium more effective is its polyvalent nature. The other alkali metals above cesium in the periodic table do not exhibit this property. The known higher valencies indicate that electrons are lost with greater ease; that is, less energy is required to cause a reaction. This again makes longer wave lengths of light effective since less energy is associated per quantum of radiation of long wave length. Again, the presence of cesium mono-nitrate makes a greater proportion of the light falling upon the paper effective.

The stabilizing influence of the catalyst on the sensitizing solution is not impaired by this probable change, and it is to be observed that regardless of whether this preferred catalyst or one of the catalysts disclosed in other pending applications is present, the sensitized layer is rendered definitely more stable with respect to the final keeping property of the paper, and with respect to that characteristic of the sensitized layer which makes possible the development of an intense blue background, white lines, and freedom from bleeding.

We do not wish to restrict the use of the catalysts disclosed in this application to sensitized blue print papers which are to be developed exclusively by the process disclosed in our U. S. Patent No. 2,093,421. The inclusion of the catalysts here disclosed has been shown to be definitely desirable in connection with all of the known blue print sensitizing solutions now in use. The use of this catalysts in sensitized papers which are to be developed by our predeveloper referred to above, are particularly advantageous in those cases where maximum speed and maximum color intensity are essential.

Although the above catalyst may be added to the known types of blue print sensitizing solutions with beneficial results, in practice we prefer to formulate sensitizing solutions particularly adapted to take advantage of the catalytic reactions induced by this substance.

Satisfactory formulas follow:

1. Potassium oxalate _____ oz __ 12
2. Oxalic acid _____ oz __ 1
3. Cesium mono-nitrate _____ oz __ 6
4. Ferric ammonium oxalate _____ lbs __ 8
5. Potassium ferricyanide _____ oz __ 6½
6. Water, to bring the solution to 14.5° Bé.

This formula makes approximately five (5) gallons.

1. Potassium carbonate _____ oz __ 10
2. Oxalic acid _____ oz __ 8
3. Cesium acid tartrate _____ oz __ 8
4. Ferric ammonium oxalate _____ lbs __ 10
5. Potassium ferricyanide _____ oz __ 5½
6. Water, to bring the solution to 15° Bé.

This formula makes approximately five (5) gallons.

A paper sensitized with the above solutions will not produce good prints when developed in the ordinary manner, due to their low potassium ferricyanide content. If a special predeveloper of the type described in our U. S. Patent No. 2,093,421 and hereinafter described is not used, the color is not sufficiently deep.

However, when a paper coated with the above types of sensitizers are treated with this special type of predeveloper, an exceptionally fine print will result. For example, the so-coated sheet should be developed in a solution such as the following and then be washed and treated with an oxidizing solution and rinsed.

1. Potassium carbonate _____ oz __ 10
2. Oxalic acid _____ oz __ 8.5
3. Disodium phosphate (Na₂HPO₄.12H₂O) _____ oz __ 22
4. Glucose _____ oz __ 5.5
5. Potassium ferrocyanide _____ lbs __ 7
6. Sodium bisulphite _____ oz __ 13.5
7. Water, to make _____ gals __ 5

A number of other satisfactory predeveloper solutions are disclosed in our said U. S. Patent No. 2,093,421. Another satisfactory solution is as follows:

1. Potassium carbonate _____ oz __ 11
2. Oxalic acid _____ oz __ 9.5
3. Disodium phosphate (Na₂HPO₄.12H₂O) _____ oz __ 24
4. Sucrose _____ oz __ 8
5. Potassium ferrocyanide _____ lbs __ 8
6. Sodium bisulphite _____ oz __ 12
7. Water, to make _____ gals __ 5

When the exposed paper is washed in a solution such as above defined, the excess of ferrous iron in the exposed portions reacts with the ferroyanide of the predeveloping solution to form ferro-ferrocyanide. The concentration of the ferrocyanide ion in the developer is great enough so that no ferrous iron has the opportunity to wash or bleed due to the insolubility of ferrous ferrocyanide.

The exposed paper is then given the customary water wash, bichromate wash and water rinse.

When in use, this predeveloper gives better results if the oxidation of the ferrocyanide is inhibited by the presence of a reducing agent, but this reducing agent must not be strong enough to reduce the iron in the ferric complex on the paper. In practice, sodium bisulphite has been found satisfactory.

A further improvement in the brilliance of the print is achieved by decreasing the particle size of the pigment on the paper. This is done by means of aliphatic polyhydroxyl compounds, aliphatic aldehydes and aliphatic ketones incorporated in the predeveloper which will not react with iron salts to form insoluble reaction products. In practice, various sugars are satisfactory.

In order to obtain good whites with the ferrocyanide predeveloper, it is necessary to buffer the acid concentration rather carefully. Any of the common acid buffers are satisfactory, provided they do not have too powerful oxidizing or reducing properties. In use are mixtures of potassium oxalate, potassium acid oxalate and oxalic acid or mixtures of sodium acid phosphate and oxalic acid.

It will be noted that the catalyst constitutes a small but definite component in the sensitizers disclosed.

Although the specific chemical or chemical-physical mechanism is not understood, it is believed that the action is catalytic. This catalyst may be incorporated with the known type of sensitizing solution as follows:

Grams

I. 1. Cesium mono-nitrate _____ 3
2. Citric acid _____ 6
3. Potassium oxalate _____ 6
4. Ferric ammonum oxalate _____ 39
5. Potassium ferricyanide _____ 9.5
6. Water—to make 250 cc.

II. 1. Cesium sulphate _____ 3
2. Potassium oxalate _____ 6
3. Citric acid _____ 6
4. Ferric ammonium oxalate _____ 40
5. Potassium ferricyanide _____ 7.5
6. Water—to make 250 cc.

This formula is for development in the customary manner involving washing and treatment with an oxidizing agent.

In all cases the inclusion of the catalyst improves the speed and the blue color, improves the ease of washing the paper and stabilizes the sensitizing solution against deterioration during storage, as well as stabilizing the paper thus coated against rapid spoiling under normal or adverse atmospheric conditions.

We claim:

1. The method of making blue prints which consists in coating a paper with a solution comprising a light-reducible ferric complex, a ferricyanide salt and a cesium salt, then exposing parts of said paper to light and then developing said paper.

2. The method of making blue prints which consists in coating a paper with a solution comprising a light-reducible ferric complex, a ferricyanide salt and a cesium salt, then exposing parts of said paper to light and then treating said paper in a predeveloper comprising an acid reacting water solution of a ferricyanide.

3. A coating for blue print paper comprising a light-reducible ferric complex, a ferricyanide salt and a cesium salt.

CLYDE A. CROWLEY.
GEORGE H. GOODYEAR.